(12) United States Patent
Priess et al.

(10) Patent No.: US 9,003,711 B2
(45) Date of Patent: Apr. 14, 2015

(54) SEAL ARRANGEMENT FOR OPENING OF A VEHICLE BODY

(75) Inventors: Klaus-Albert Priess, Mainz (DE); Michael Alhof, Floersheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/338,296

(22) Filed: Dec. 28, 2011

(65) Prior Publication Data

US 2012/0180398 A1    Jul. 19, 2012

(30) Foreign Application Priority Data

Dec. 28, 2010 (DE) .......................... 10 2010 056 387
May 25, 2011 (DE) .......................... 10 2011 102 455

(51) Int. Cl.
  *E06B 7/16* (2006.01)
  *B60J 10/08* (2006.01)
  *B60J 10/00* (2006.01)

(52) U.S. Cl.
  CPC .............. *B60J 10/081* (2013.01); *B60J 10/004* (2013.01); *B60J 10/0062* (2013.01)

(58) Field of Classification Search
  USPC ............. 49/475.1, 490.1, 492.1, 493.1, 498.1
  See application file for complete search history.

(56) References Cited

U.S. PATENT DOCUMENTS

| | | | | |
|---|---|---|---|---|
| 2,554,452 A | * | 5/1951 | Bright | 49/490.1 |
| 2,664,602 A | * | 1/1954 | Bright | 49/490.1 |
| 2,702,416 A | * | 2/1955 | Bright | 49/490.1 |
| 2,746,103 A | * | 5/1956 | Bright | 49/490.1 |
| 4,263,750 A | * | 4/1981 | Hein | 49/490.1 |
| 6,837,005 B2 | * | 1/2005 | Arata et al. | 49/440 |
| 6,966,601 B2 | * | 11/2005 | Matsumoto et al. | 296/146.2 |
| 8,286,389 B2 | * | 10/2012 | Lichtner et al. | 49/490.1 |
| 2005/0120634 A1 | * | 6/2005 | Drivon et al. | 49/475.1 |

FOREIGN PATENT DOCUMENTS

| | | |
|---|---|---|
| DE | 9319328 U1 | 2/1994 |
| DE | 4441852 A1 | 5/1996 |
| DE | 10214848 A1 | 10/2003 |
| DE | 102008034251 A1 | 1/2010 |

(Continued)

OTHER PUBLICATIONS

UK IPO, British Search Report for Application No. 1120180.3, dated Mar. 15, 2012.

*Primary Examiner* — Katherine Mitchell
*Assistant Examiner* — Catherine A Kelly
(74) *Attorney, Agent, or Firm* — Ingrassia Fisher & Lorenz, P.C.

(57) ABSTRACT

A seal arrangement is provided for an opening, in particular a door or window opening of a vehicle body, having a fastening flange delimiting the opening, which is used for fastening a peripheral seal profile part and is formed by at least one vehicle body part, the fastening flange provided with one or more projections arranged around the opening on at least one flange face and the seal profile part having at least one shoulder, which engages behind the projections, for fastening on the fastening flange. A seal profile part is also provided and a method is provided for the production of a seal arrangement. A seal profile part having at least one shoulder is applied to the fastening flange delimiting the opening. The at least one shoulder caused to engage behind one or more projections of the fastening flange to fasten the seal profile part on the fastening flange.

10 Claims, 6 Drawing Sheets

(56) References Cited

FOREIGN PATENT DOCUMENTS

| GB | 2294964 | A | 5/1995 |
| GB | 2379239 | A | 3/2003 |
| GB | 2388398 | A | 11/2003 |
| JP | 8020244 | A | 1/1996 |

* cited by examiner

SEAL ARRANGEMENT FOR OPENING OF A VEHICLE BODY

CROSS-REFERENCE TO RELATED APPLICATION

This application claims priority to German Patent Application No. 102010056387.0, filed Dec. 28, 2010, which is incorporated herein by reference in its entirety, and also claims priority to German Patent Application No. 102011102455.0, filed May 25, 2011, which are incorporated herein by reference in their entirety.

TECHNICAL FIELD

The technical field relates to automotive technology and further relates to a seal arrangement for an opening, in particular a door or window opening and trunk or hatchback opening, of a vehicle body. Furthermore, the technical field relates to a seal profile part for such a seal arrangement and a method for the production thereof.

BACKGROUND

Typical seal arrangements for closable openings of motor vehicles comprise a seal profile part, which is fastened on a fastening flange delimiting the opening. In order to achieve the desired sealing action, the seal profile part is produced from a dimensionally stable, plastically deformable seal material. For fastening on the fastening flange, the seal profile part typically has a main body which is U-shaped in cross-section, and which has two similar leg sections, which jointly form a channel-shaped receptacle for the fastening flange.

The so-called roll forming method is typically used in the installation of the seal arrangement, in which the two leg sections of the seal profile part, which has been pushed onto the fastening flange, are compressed by a roll forming tool that spans the two leg sections, until they are in friction-locked engagement with the fastening flange. Sealing lips, which come into contact with the fastening flange, are typically formed on the inner sides of the two leg sections. Such seal arrangements are currently implemented in many motor vehicles. The models "Opel Corsa" or "Opel Astra" of the applicant are mentioned solely as examples. German Published Application DE 102008034251 A1 and German Utility Model G 9319328.9, present a description of the roll forming method also being able to be inferred from the latter publication.

At least one object comprises providing a seal arrangement for an opening of a vehicle body, by which typical seal arrangements are advantageously refined. In addition, other objects, desirable features, and characteristics will become apparent from the subsequent summary and detailed description, and the appended claims, taken in conjunction with the accompanying drawings and this background.

SUMMARY

A seal arrangement is provided for an opening, in particular a door or window opening and trunk or hatchback opening, of a vehicle body. The seal arrangement comprises a fastening flange delimiting the opening, which is used to fasten a peripheral seal profile part and is formed by at least one vehicle body part. The fastening flange has two flange faces that are arranged opposite one another. In this case, that the fastening flange is provided on at least one flange face with one or more projections arranged around the opening and the seal profile part has at least one shoulder, which engages behind the projections, for fastening on the fastening flange. In this context, the term "engaging behind" is to be understood as a formfitting connection or hooking between the at least one shoulder and the projections, by which removal of the seal profile part toward the opening is prevented.

The seal arrangement therefore allows particularly simple and reliable installation of the seal profile part on the fastening flange, which optionally makes the typical use of the roll forming method dispensable. In spite of possible variable material thicknesses on the peripheral fastening flange, reliable fastening of the seal profile part on the fastening flange can be achieved, the seal profile part pressing against the fastening flange to form a good seal.

In an embodiment of the seal arrangement, the seal profile part has one or more profile sections that are connected by a friction lock to the fastening flange, which can particularly be implemented as sealing lips or sealing tongues or sealing strips. Through this measure, an improvement of the hold of the seal profile part on the fastening flange can advantageously be achieved. It can particularly be advantageous if the at least one profile section, which is connected by a friction lock to the fastening flange, is connected by a friction lock to the flange face and the other flange face is provided with one or more projections, which the at least one shoulder of the seal profile part engages behind for fastening on the fastening flange. A hold of the seal profile part that forms a particularly good seal on the fastening flange can be achieved by this measure.

In an embodiment of the seal arrangement, both flange faces are each provided with one or more projections arranged around the opening and the seal profile part has at least two shoulders, which engage behind the projections, for fastening on the fastening flange. A hold of the seal profile part that forms a particularly good seal on the fastening flange can also be achieved by this measure.

In an embodiment of the seal arrangement, the projections are each implemented as a protrusion, in particular an embossment, of at least one vehicle body part of the fastening flange. This advantageously allows particularly simple and cost-effective production of the projections of the fastening flange in industrial mass production of motor vehicles.

In a further embodiment of the seal arrangement, the seal profile part has at least one peripheral shoulder, which engages behind a plurality of projections of the fastening flange, which are arranged adjacent to one another in a row. This embodiment allows particularly simple, reliable, and secure fastening of the peripheral seal profile part on the fastening flange around the door opening.

In a further embodiment of the seal arrangement, the seal profile part has a stiffening inlay part, where the hold of the seal profile part on the fastening flange can be improved further. In a further advantageous embodiment of the seal arrangement, the seal profile part is implemented so that the at least one shoulder engages behind the projections merely by applying the seal profile part to the fastening flange. This embodiment allows particularly simple, reliable, and cost-effective installation of the seal arrangement.

Alternatively thereto, in the seal arrangement, the seal profile part can be implemented so that the at least one shoulder engages behind the projections by a deformation, in particular by roll forming, of the seal profile part applied to the fastening flange, where particularly reliable fixing of the seal profile part on the fastening flange can similarly be achieved.

In a further embodiment of the seal arrangement, the at least one shoulder is arranged on a leg section of a main body, which receives the fastening flange and is U-shaped in cross-section. In this embodiment, the seal profile part has a particularly simple construction, which allows reliable fixing on the fastening flange in practical application.

Furthermore, a seal profile part is provided for an opening, in particular a door or window opening of a vehicle body, for fastening on a fastening flange, which delimits the opening, having two flange faces, which has at least one shoulder, which is implemented so that it can be engaged behind one or more projections of at least one flange face of the fastening flange for fastening the seal profile part on the fastening flange.

In an embodiment of the seal profile part, it is provided with one or more profile sections for friction-locked connection to the fastening flange, in order to improve the fixing of the seal profile part on the fastening flange in this way. It can be advantageous if the at least one profile section for friction-locked connection to the fastening flange is arranged so that it can be connected by a friction lock to one flange face, and the at least one shoulder is arranged so that it can engage behind projections of the other flange face.

In an alternative embodiment of the seal profile part, it has at least two shoulders, which are arranged so that at least one shoulder can engage behind one or more projections, which are arranged around the opening, on one flange face and at least one other shoulder can engage behind one or more projections, which are arranged around the opening, on the other flange face. In a further embodiment of the seal profile part, it has a stiffening inlay part, where the hold of the seal profile part on the fastening flange can be improved further.

Furthermore, a method is provided for producing a seal arrangement for an opening, in particular a door or window opening of a vehicle body, in which a seal profile part having at least one shoulder is applied to a fastening flange, which delimits the opening, having two flange faces, the at least one shoulder being engaged behind one or more projections of the fastening flange to fasten the seal profile part on the fastening flange.

In an embodiment of the method, the at least one shoulder engages behind the projections merely by applying the seal profile part of the fastening flange, which allows particularly simple installation of the seal profile part. In a further embodiment of the method, the at least one shoulder is engaged behind the projections by deforming, in particular roll forming, the seal profile part applied to the fastening flange.

Furthermore, a motor vehicle is provided that is equipped with at least one above-described seal arrangement.

BRIEF DESCRIPTION OF THE DRAWINGS

The present invention will hereinafter be described in conjunction with the following drawing figures, wherein like numerals denote like elements and.

DETAILED DESCRIPTION

The following detailed description is merely exemplary on nature and is not intended to limit application and uses. Furthermore, there is no intention to be bound by any theory presented in the preceding background or summary or the following detailed description.

Figure 3A:
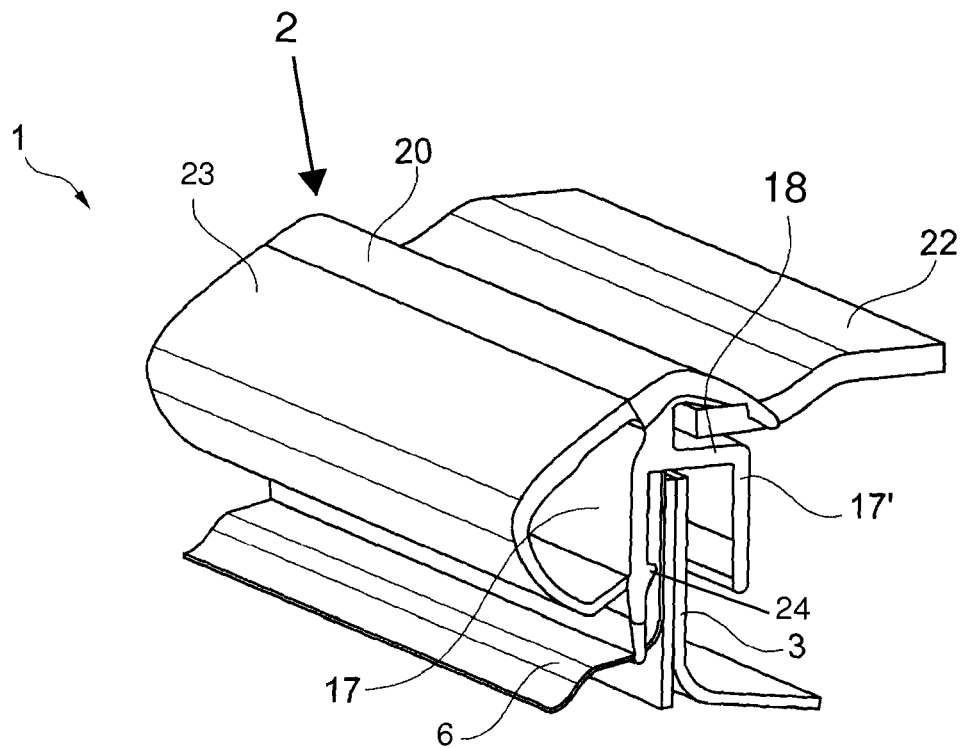
Figure 3B:
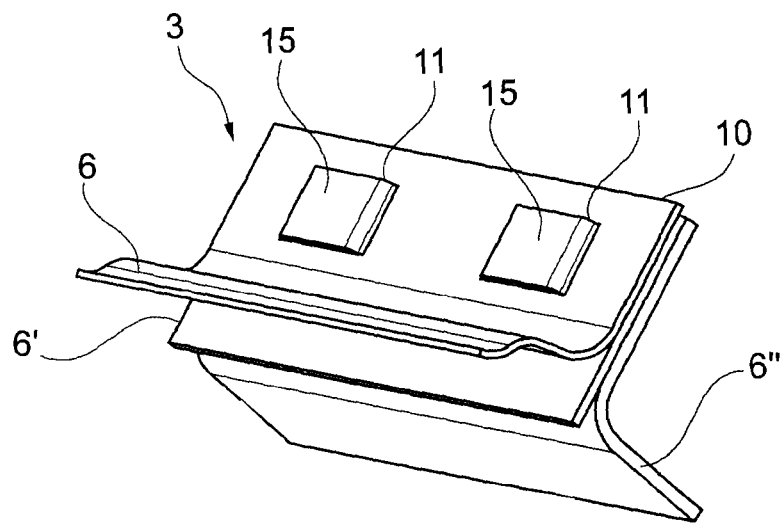
Figure 4:
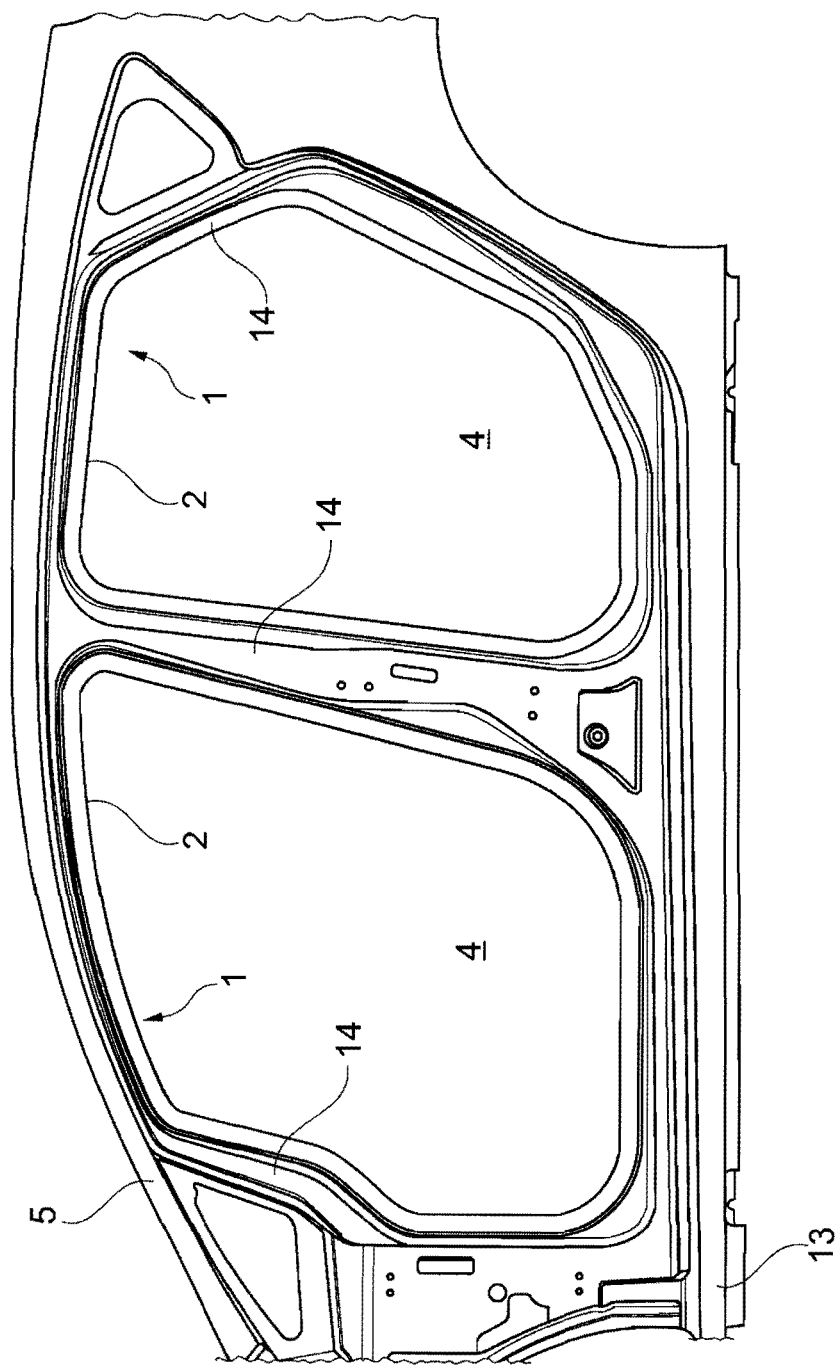
FIG. 4 shows a perspective view of the seal arrangement of FIG. 1.

In the figures, exemplary embodiments of a seal arrangement are illustrated that is identified as a whole by the reference sign 1. FIG. 1 to FIG. 4 will be considered first. As shown in FIG. 4, the seal arrangement 1 is implemented here, for example, in the door openings 4 for the front and rear side doors in a side wall 5 of a vehicle body (not shown in greater detail). In particular a horizontal side sill 13 and multiple vertical struts 14, the so-called A, B, and C columns, which are arranged offset to one another in the vehicle longitudinal direction, are recognizable on the side wall 5.

In the seal arrangement 1, a seal profile part 2 is fastened on a strip-shaped fastening flange 3 that delimits the door opening 4. The fastening flange 3 is formed by the edge sections of multiple sheet-metal parts 6, 6', 6'', which are located one on top of another, of the side wall 5 in the area of the door opening 4. Depending on the special design of the side wall 5 and as determined by the specific requirements for the load absorption, the number and material thicknesses of the sheet-metal parts 6, 6', 6'' in the peripheral direction may vary. As a result, the thickness of the fastening flange 3, which results from the sum of the material thicknesses 6, 6', 6'', can vary around the door opening 4. Three sheet-metal parts 6, 6', 6'' having different material thicknesses are shown in the figures as an example, it being obvious that a greater or smaller number of sheet metal parts 6, 6', 6'' having material thicknesses which are identical to or different from one another can similarly be provided to form the fastening flange 3 peripheral to the door opening 4. In the exemplary embodiment, an outer sheet-metal part 6 and an inner sheet metal part 6'' press against a middle sheet-metal part 6' to form the fastening flange 3. The sheet-metal parts 6, 6', 6'', which are flat in the area of the fastening flange 3, are arranged parallel to one another. Outside the fastening flange 3, the sheet-metal parts 6, 6', 6'' are generally no longer flat and are separate from one another.

The sheet-metal parts 6, 6', 6'' are fixedly connected to one another in the area of the fastening flange 3, which can be performed by typical connection techniques such as welding, riveting, or clinching. The sheet-metal parts 6, 6', 6'' are connected to one another, for example, by a plurality of welded bonds arranged adjacent to one another in a row, which is not shown in greater detail in the figures. The outer sheet-metal part 6 forms an outer flange face 8 and the inner sheet metal part 6'' forms an inner flange face 9 of the fastening flange 3, the outer flange face 8 facing toward the vehicle outer side or outer surroundings of the vehicle and the inner flange face 9 facing toward the vehicle interior. The fastening flange 3 therefore has two flange faces 8, 9, which are at least approximately oriented in the vehicle longitudinal direction. The sheet-metal parts 6, 6', 6'' jointly or individually form a flange edge 10, which circumscribes the door opening 4. In the present exemplary embodiment, for example, a sheet-metal part edge 26 of the outer sheet-metal part 6 forms the flange edge 10.

The outer sheet-metal part 6, i.e., the outer flange face 8, is provided in the area of the fastening flange 3 with a plurality of projections, which are formed here as pocket-shaped embossments 7, for example. As illustrated in FIG. 3B, the embossments 7 have an equal distance from the flange edge 10 and are arranged in a row adjacent to one another having an unchanged intermediate distance around the door opening 4. Welded bonds, by which the sheet-metal parts 6, 6', 6" are fixedly connected to one another in the area of the fastening flange 3, are located between adjacent embossments 7.

In the exemplary embodiment shown, the embossments 7 have a square or rectangular base 15, for example, which is arranged so that two sides or edges 11, which are opposite to one another, run parallel to the flange edge 10. Also in the exemplary embodiment shown, each embossment 7 has a cross-section that is substantially trapezoidal along a length of the flange 3. The embossments 7 protrude perpendicularly to the outer flange face 8 toward the vehicle exterior. The edges 11 are set back in steps with respect to the outer flange face 8 in each embossment 7, the outer sheet-metal part 6 being perforated at the edges 11. However, it would also be conceivable to implement the embossments 7 without such a perforation 12. The embossments 7 can be formed in the outer sheet-metal part 6 in a simple way by using an embossing tool, for example, before the welding of the sheet-metal parts 6, 6', 6".

The seal profile part 2 is produced from a dimensionally-stable but plastically deformable seal material, in particular from a thermoplastic plastic or rubber. As can be inferred in particular from the two sectional views in FIG. 1 and FIG. 2, it comprises an open main body 16, which is U-shaped in cross-section, having two leg sections 17, 17', which are connected to one another by a connection section 18. The main body 16 forms a channel-shaped first receptacle 19 for the fastening flange 3.

A hooked curved clamping section 20 is formed on the main body 16, which, jointly with the connection section 18, forms a channel-shaped second receptacle 21 for an inner panel 22 of the passenger compartment. If the inner panel 22 is inserted into the second receptacle 21, it is fixed by the clamping force exerted by the clamping section 18. The clamping section 18 is only shown schematically in FIG. 1 and FIG. 2, in a form that it has without the inner panel 22. Furthermore, a closed bead section 23 is formed in the seal profile part 2 on the main body 16 and the clamping section 20, against which the side door (not shown) of the door opening 4 can come into contact to form a seal.

Figure 1:
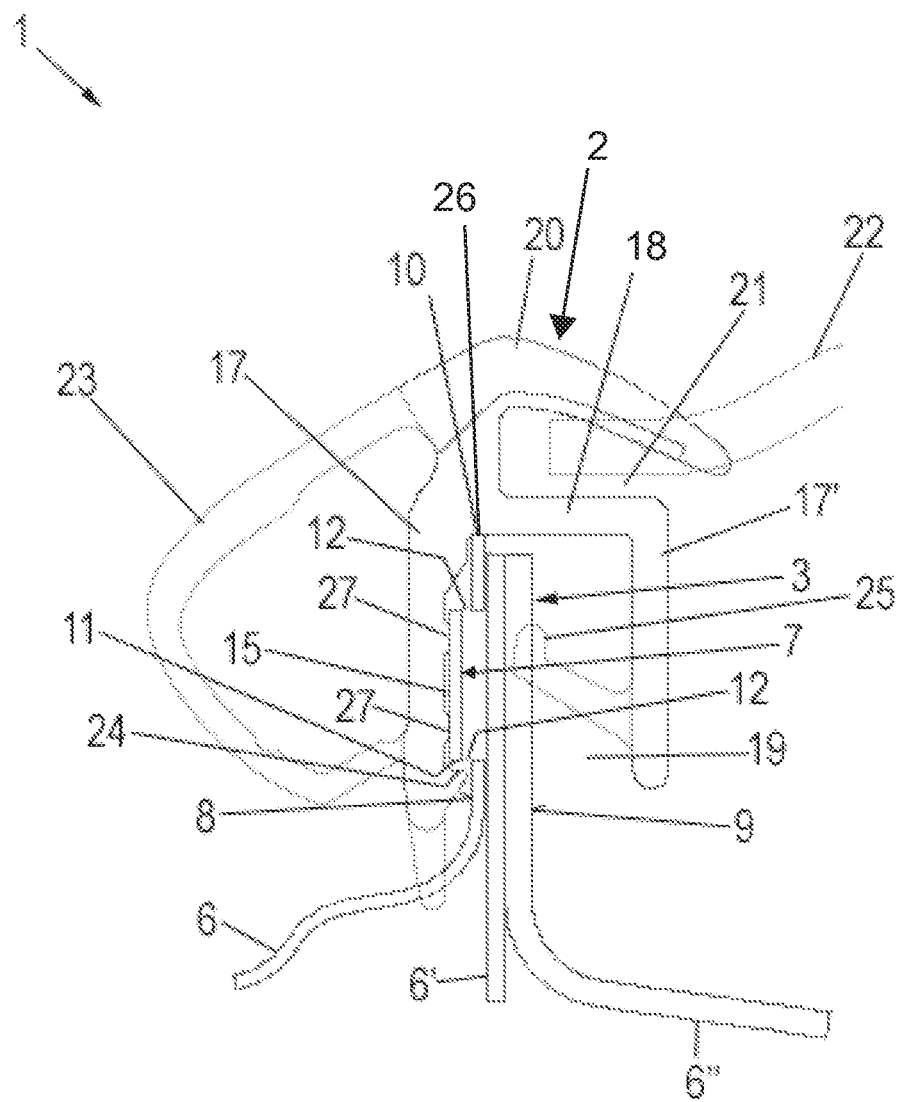
FIG. 1 shows a schematic cross-sectional view of an exemplary embodiment of the seal arrangement.
Figure 2:
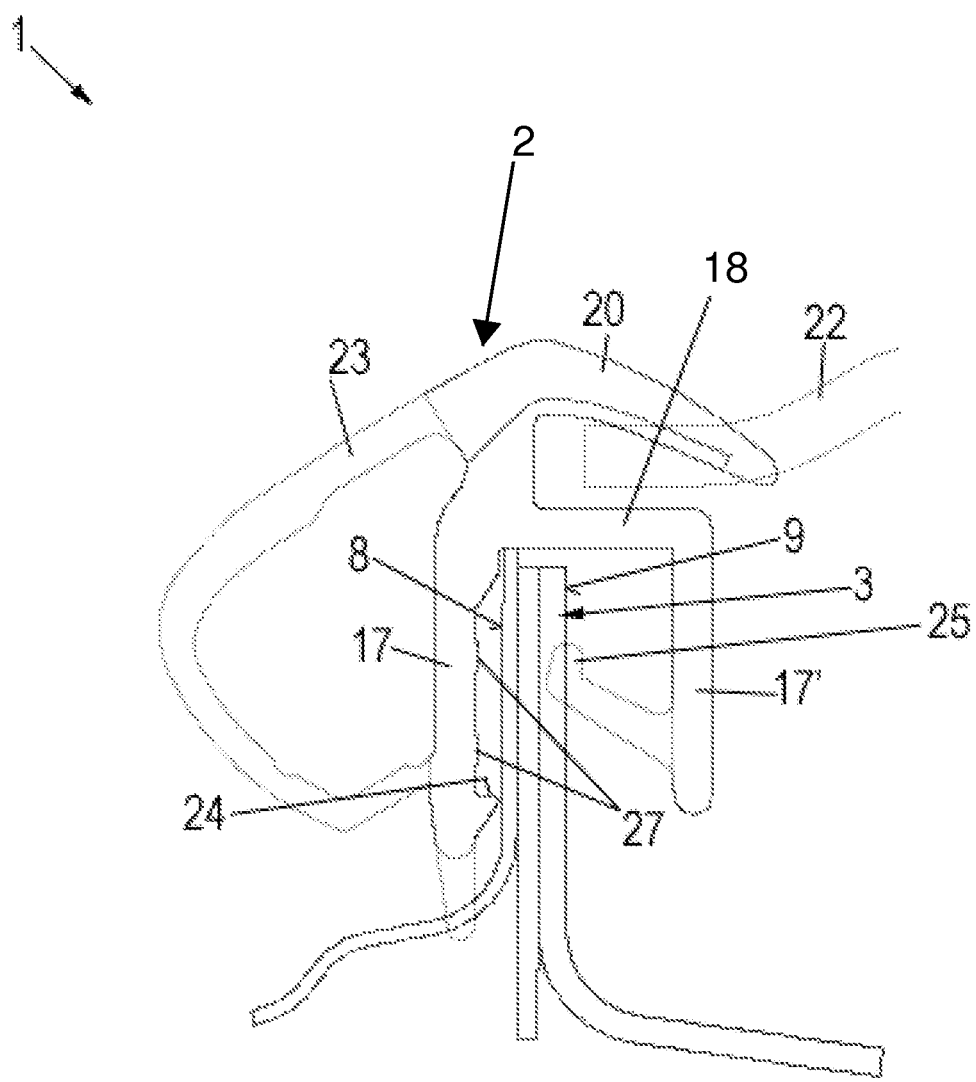
FIG. 2 shows a further schematic cross-sectional view of the seal arrangement of FIG. 1, FIG. 3A and FIG. 3B show a perspective view of a section of the seal arrangement of FIG. 1 (FIG. 3A), and a perspective view of a section of the fastening flange (FIG. 3B) of the seal arrangement of FIG. 1.

The seal profile part 2 can be applied by its main body 16 to the fastening flange 3. For this purpose, a shoulder 24 peripheral to the door opening 4 is formed on an outer leg section 17, which is located opposite to the outer sheet-metal part 6 when the seal profile part 2 is installed. The shoulder 24 can be brought into formfitting engagement with the embossments 7, the shoulder 24 engaging behind the edges 11 of the embossments 7, which face away from the door opening 4 and are parallel to the flange edge 10, in the installed state. In this way, removal of the seal profile part 2 from the fastening flange 3 in the direction toward the door opening 4 is prevented. The shoulder 24 hooks with the embossments 7 to fasten the seal profile part 2 on the fastening flange 3. This is recognizable in FIG. 1, which shows a cross-sectional view of the seal arrangement 1 in the area of an embossment 7. In contrast, thereto, FIG. 2 shows a cross-sectional view of the seal arrangement 1 in the area between two embossments 7.

When the seal profile part 2 is installed, the fastening flange 3 is at least partially received in the first receptacle 19 of the main body 16, the flange edge 10 coming into contact against the connection section 18. Since, in the exemplary embodiment shown, the outer sheet-metal part 6 protrudes somewhat on the flange edge 10 in the direction of the door opening 4 in relation to the other sheet-metal parts 6', 6", only the sheet-metal part edge 26 of the outer sheet-metal part 6 comes into contact against the connection section 18. Through this measure, the seal profile part 2 is advantageously supported in an area of the connection section 18 on the fastening flange 3 which is at least approximately opposite to the shoulder 24, where in particular the strength of the connection is improved and pivoting of the seal profile part 2 can be counteracted.

In the seal profile part 2, the other, inner leg section 17' of the main body 16 is provided with a sealing lip 25, which is formed on the inner side and is peripheral to the door opening 4, and which can be brought into friction-locked engagement with the inner flange face 9 or the inner sheet-metal part 6". In FIG. 1 and FIG. 2, the sealing lip 25 is only shown schematically in a form that it has without the fastening flange 3 received in the first receptacle 19. Of course, when the fastening flange 3 is received, it presses against the inner flange face 9. Approximately opposite to the sealing lip 25, the outer leg section 17 is provided with two sealing strips 27, which are arranged one over the other and are peripheral to the door opening 4, and which are arranged so that they are in friction-locked engagement with the bases 15 of the embossments 7 when the seal profile part 2 is installed. The hold of the seal profile part 2 on the fastening flange 3 can be improved further by this measure.

To fasten the seal profile part 2 on the fastening flange 3, the seal profile part 2 is pushed onto the fastening flange 3. The main body 16 can be implemented in particular so that merely by pushing on the seal profile part 2, the shoulder 24 engages behind or has a formfitting engagement with or hooks with the embossments 7, and the sealing lip 25 and sealing strips 30 are friction locked with the flange faces 8, 9. The main body 16 can have a U-shape of suitable size in cross-section for this purpose without received fastening flange 3. Alternatively thereto, the main body 16 can first be fastened on the fastening flange 3 by compressing the two leg sections 17, 17', for example, by roll forming by means of a tool which spans the two leg sections 17, 17', the shoulder 24 engaging behind the embossments 7 by compressing the leg sections 17, 17', and the sealing lips 25 and the sealing strips 30 being brought into a friction lock with the flange faces 8, 9. For this purpose, the main body 16 can have a U-shape or V-shape of suitable size in cross-section without received fastening flange 3.

In the installed state, the seal profile part 2 is therefore fixed on the fastening flange 3 by the formfitting connection between shoulder 24 and embossments 7. In conjunction with the flange edge 10 pressing against the connection section 18, by which a counterforce is exerted, the main body 16 can be latched on the fastening flange 3, to prevent the seal profile part 2 from being pulled off of the fastening flange 3 in the direction toward the door opening 4. In addition, the seal profile part 2 is fixed on the fastening flange 3 by the friction-locked connections between the sealing lip 25 and the inner flange face 9 and between the sealing strips 27 and the outer flange face 8. The seal profile part 2 can therefore be fastened in a simple way on the fastening flange 3. Detachment from the fastening flange 3 can be reliably and securely prevented.

A stiffening inlay, for example, a metal inlay can optionally be embedded in the main body 16, which is not shown in greater detail in the figures. The strength of the connection between seal profile part 2 and fastening flange 3 can be improved still further in this way. The use of a stiffening inlay is not an absolute requirement for reliable and secure fastening of the seal profile part 2 on the fastening flange 3, however.

Figure 5:
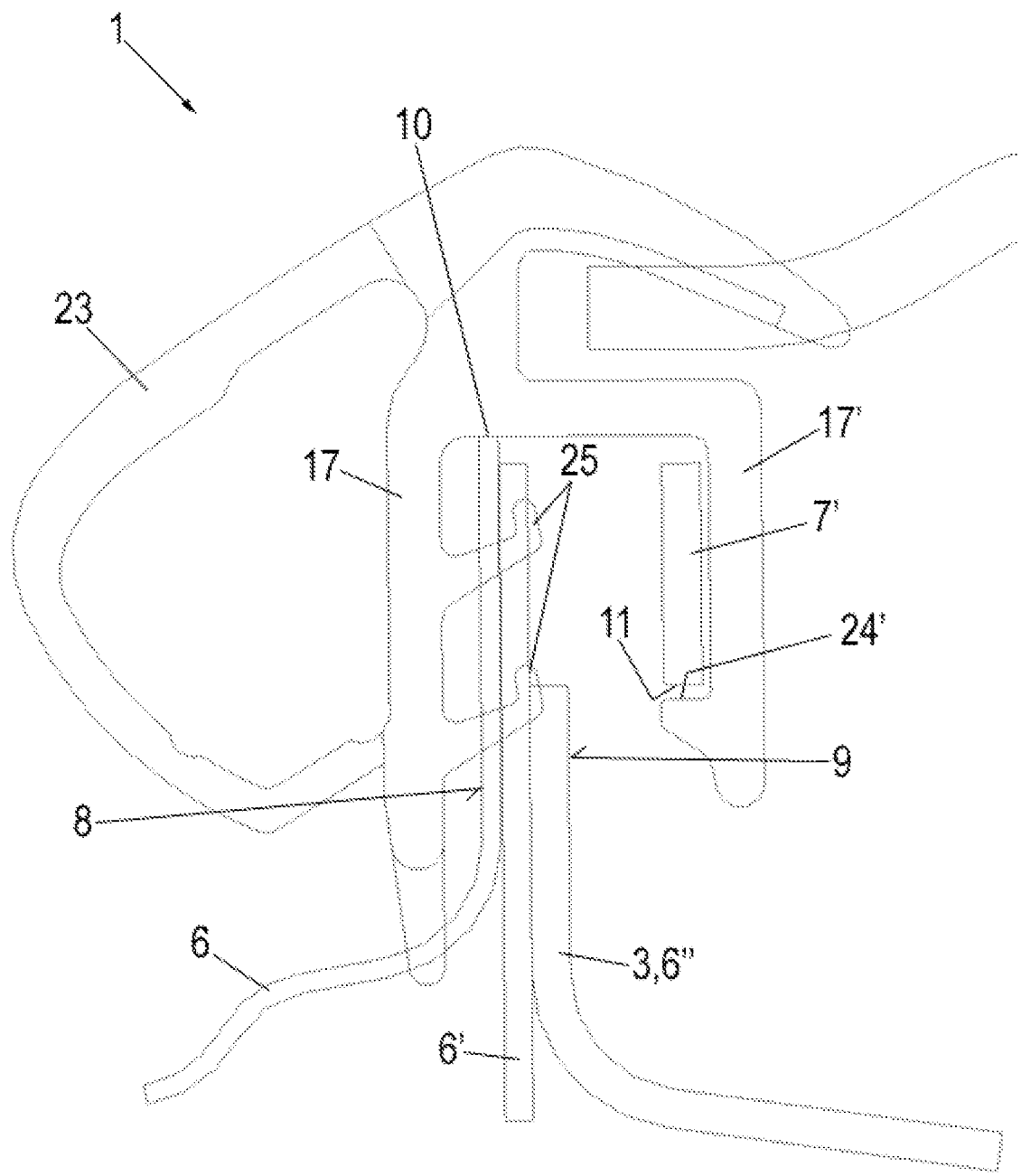
FIG. 5 shows a schematic cross-sectional view of a variant of the seal arrangement of FIG. 1.

Reference will now be made to FIG. 5, in which a variant of the seal arrangement 1 explained on the basis of FIG. 1 to FIG. 4 is shown. To avoid unnecessary repetitions, only the differences from this seal arrangement will be explained and otherwise reference will be made to the statements made therein. Accordingly, instead of the outer sheet-metal part 6, the inner sheet metal part 6" or the inner flange face 9 is provided with embossments 7', which are arranged at an equal distance from flange edge 10 in a row adjacent to one another having an unchanged intermediate distance around the door opening 4. The embossments 7' protrude perpendicularly to the inner flange face 9 toward the vehicle interior. The seal profile part 2 is implemented in a corresponding way so that on the inner leg section 17', which is located opposite to the inner sheet-metal part 6" when the seal profile part 2 is installed, a shoulder 24' peripheral to the door opening 4 is implemented, which can be brought into formfitting engagement with embossments 7'. On the other hand, the other, outer leg section 17 of the main body 16 in the seal profile part 2 is provided with two sealing lips 25, which are formed on the inner side and are peripheral to the door opening 4, and which can be brought into friction-locked engagement with the outer flange face 8 or the outer sheet-metal part 6. The two sealing lips 25 are each peripheral to the door opening 4 and have a parallel course having an at least approximately equal intermediate distance. Although no sealing strips 27 of the inner leg section 17' are shown in the area of the embossments 7 in FIG. 5, such sealing strips 27 can be formed on to improve the friction-locked connection to the fastening flange 3 still further.

Figure 6:
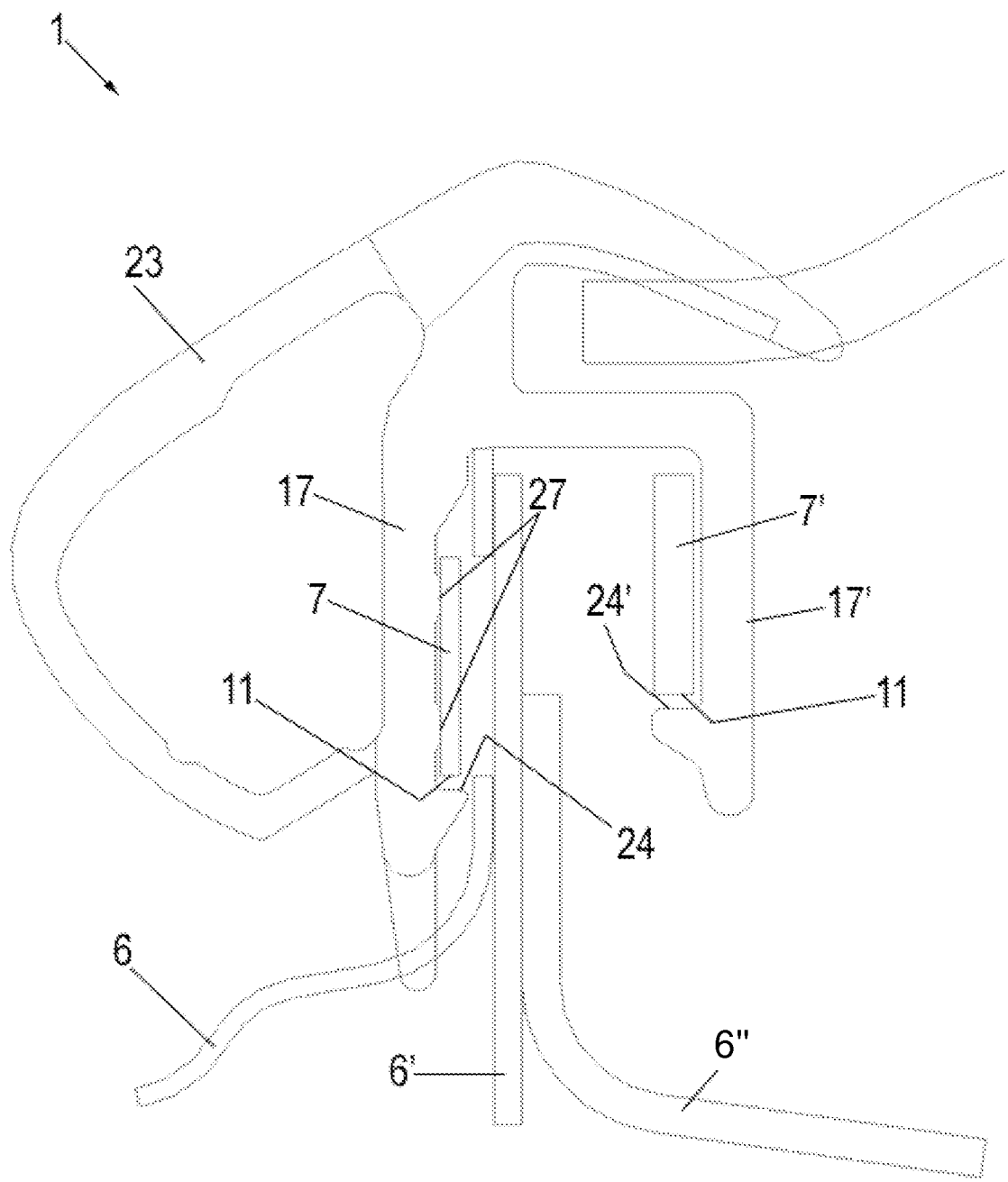
FIG. 6 shows a schematic cross-sectional view of a further variant of the seal arrangement of FIG. 1.

A further variant of the seal arrangement 1 explained based on FIG. 1 to FIG. 4 is shown in FIG. 6. To avoid unnecessary repetitions, again only, the differences from this seal arrangement will be explained and otherwise reference will be made to the statements made therein. Accordingly, both the outer sheet-metal part 6 or the outer flange face 8 and also the inner sheet metal part 6" or the inner flange face 9 are provided with embossments 7, 7', which are each arranged at an equal distance from the flange edge 10 in a row adjacent to one another having an unchanged intermediate distance around the door opening 4. The embossments 7 on the outer flange protrude toward the vehicle exterior side or external environment. The embossments 7' on the inner flange face 9 protrude toward the vehicle interior. The embossments 7, 7' on the two flange faces 8, 9 have a different distance from the flange edge 10 here, for example, but may also have the same distance from the flange edge 10. The embossments 7, 7' on the two flange faces 8, 9 may be arranged, for example, so that they are opposite to one another or are staggered.

Correspondingly, the seal profile part 2 is implemented so that, both on the outer leg section 17 and on the inner leg section 17', a peripheral shoulder 24, 24' is implemented in each case, which can be brought into formfitting engagement with the embossments 7, 7' located on the same side. In this embodiment, the seal profile part 2 does not have sealing lips 25. On the other hand, sealing strips 27 are formed on the outer leg section 17, which reach friction-locked engagement with the outer flange face 8 in the area of the embossments 7. Although no sealing strips, 27 of the inner leg section 17' are shown in the area of the embossments 7' in FIG. 6, such sealing strips 27 may also be formed on.

The seal arrangement 1 according to the invention allows simple, rapid, and reliable installation of the seal profile part 2 on the fastening flange 3 of the door opening 4. The seal profile part 2 can be fixed on the fastening flange 3 by at least one or more shoulders 24, 24', which engage behind embossments 7, 7' on one or both flange faces 8, 9, the seal profile part 2 additionally being able to be connected by a friction lock to the fastening flange 3 by at least one sealing lip 25 and sealing strips 27. Installation of the seal profile part 2 can be performed by pushing it onto the fastening flange 3, the application of a roll forming method optionally being able to be omitted, whereby time and costs during the installation of the seal arrangement 1 can be saved in the industrial mass production of motor vehicles. A stiffening metal inlay in the main body 16 can optionally also be omitted, whereby further costs can be saved.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any ways. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seal arrangement for an opening of a vehicle body, comprising:
    a fastening flange having a flange edge delimiting the entire opening and formed by at least one vehicle body part;
    wherein the fastening flange comprises two flange faces;
    wherein at least one of the two flange faces defines one or more projections arranged around the opening, each of the one or more projections being substantially rectangular and having a base facing away from the at least one flange face and wherein a cross-section of each of the one or more projections along a length of the flange is substantially trapezoidal; and
    a peripheral seal profile part comprising an outer leg section and an inner leg section, wherein the outer leg section includes at least one shoulder extending along an edge of the one or more projections facing an opposite direction from the flange edge, and wherein the outer leg section also includes a pair of sealing strips protruding therefrom with each strip defining a substantially flat face to engage with the base of the one or more projections such that at least one void is formed between the base and the outer leg section.

2. The seal arrangement according to claim 1, wherein the inner leg section is connected to the fastening flange by a friction lock.

3. The seal arrangement according to claim 1, wherein both flange faces are each provided with the one or more projections arranged around the opening, and the inner leg section includes at least one shoulder extending under the one or more projections with respect to the flange edge.

4. The seal arrangement according to claim 1, wherein the one or more projections are each implemented as a protrusion of at least one vehicle body part of the fastening flange.

5. The seal arrangement according to claim 1, wherein the one or more projection is further defined as a plurality of projections arranged in a row adjacent to one another.

6. The seal arrangement according to claim 1, wherein the peripheral seal profile part has a stiffening inlay part.

7. The seal arrangement according to claim 1, wherein the at least one shoulder is arranged on a leg section of a main body, which is U-shaped in cross-section and receives the fastening flange.

8. The seal arrangement according to claim 1, wherein the seal profile part further comprises a connection section and a curved clamping section, wherein a first receptacle is defined by the inner and outer leg sections and the connection section for accommodating the fastening flange and a second receptacle is defined by the curved clamping section and the connection section for accommodating an inner panel of the vehicle body.

9. A seal arrangement for an opening of a vehicle body, comprising:
- a fastening flange having a flange edge delimiting the opening and formed by at least one vehicle body part;
- wherein the fastening flange comprises two flange faces;
- wherein at least one of the two flange faces defines one or more projections arranged around the opening, each of the one or more projections being substantially rectangular and having a base facing away from the at least one flange face and defining a plane generally parallel to a plane defined by the at least one flange face and wherein a cross-section of each of the one or more projections along a length of the flange is substantially trapezoidal; and
- a peripheral seal profile part comprising an outer leg section and an inner leg section, wherein the outer leg section includes at least one shoulder extending along an edge of the one or more projections facing an opposite direction from the flange edge, and wherein the outer leg section also includes at least one sealing strip protruding therefrom and defining a substantially flat face to engage with the base of the one or more projections such that at least one void is formed between the base and the outer leg section.

10. The seal arrangement, according to claim 9, wherein the at least one sealing strip comprises a pair of sealing strips, each engaging with the base of the one or more projections.

* * * * *